US012050569B1

(12) United States Patent
Nirantar et al.

(10) Patent No.: US 12,050,569 B1
(45) Date of Patent: Jul. 30, 2024

(54) METHOD AND SYSTEM FOR PROVIDING DATA QUALITY AS A SERVICE

(71) Applicant: JPMorgan Chase Bank, N.A., New York, NY (US)

(72) Inventors: Prashant Nirantar, Monroe Township, NJ (US); Stephen C Bossong, West Grove, PA (US); Parul Singh, Hyderabad (IN); Aditya Toleti, Hyderabad (IN); Vikram Mirmira, Hyderabad (IN)

(73) Assignee: JPMORGAN CHASE BANK, N.A., New York, NY (US)

( * ) Notice: Subject to any disclaimer, the term of this patent is extended or adjusted under 35 U.S.C. 154(b) by 0 days.

(21) Appl. No.: 18/114,552

(22) Filed: Feb. 27, 2023

(30) Foreign Application Priority Data

Jan. 14, 2023 (IN) .............................. 202311002948

(51) Int. Cl.
*G06F 16/215* (2019.01)
(52) U.S. Cl.
CPC ................................ *G06F 16/215* (2019.01)
(58) Field of Classification Search
CPC .................................................. G06F 16/215
USPC ....................................................... 707/694
See application file for complete search history.

(56) References Cited

U.S. PATENT DOCUMENTS

| | | | | |
|---|---|---|---|---|
| 2018/0314576 | A1* | 11/2018 | Pasupuleti | G06F 11/0754 |
| 2019/0121898 | A1* | 4/2019 | Giresi | G06F 16/2455 |
| 2020/0380379 | A1* | 12/2020 | Tatti | G06F 16/221 |
| 2021/0286663 | A1* | 9/2021 | Thomas | G06F 11/076 |
| 2021/0342315 | A1* | 11/2021 | Le Blang | G06F 16/283 |
| 2022/0066840 | A1* | 3/2022 | Rutland | G06F 9/4881 |
| 2023/0328070 | A1* | 10/2023 | Zhang | H04L 63/08 |
| | | | | 726/4 |

* cited by examiner

*Primary Examiner* — Kimberly L Wilson
(74) *Attorney, Agent, or Firm* — Greenblum & Bernstein, P.L.C.

(57) ABSTRACT

An enterprise level Application Programming Interface (API) driven service to integrate and automate data quality processes within organizations is provided. The service has capabilities to ingest data from heterogenous data sources and provide data quality metrics irrespective of data domain type. A subscribing application can write Data Quality (DQ) checks as code using templates of a customized rule engine and generate metrics based on pre-defined schedules. Analytics and visualization and reporting capabilities of the service empower stakeholders such as data managers, application developers, and risk assessors to obtain actionable insights into data quality. Stakeholders can use service-generated DQ measures, such as accuracy, completeness, and timeliness, to identify data quality concerns and proactively implement remediation actions to reduce data use risk. Artificial Intelligence (AI)/Machine Learning (ML) modeling techniques are used to analyze data quality, identify data anomalies, measure data quality metrics, and generate an overall data quality score.

17 Claims, 8 Drawing Sheets

800

METHOD AND SYSTEM FOR PROVIDING DATA QUALITY AS A SERVICE

CROSS-REFERENCE TO RELATED APPLICATIONS

This application claims priority benefit from Indian Application No. 202311002948, filed Jan. 14, 2023 in the Indian Patent Office, which is hereby incorporated by reference in its entirety.

BACKGROUND

1. Field of the Disclosure

This technology generally relates to methods and systems for providing data quality as a service, and more particularly to methods and systems for integrating and automating data quality components of defining, analyzing, measuring, and remediating, and empowering application owners to obtain actionable insights to data quality issues

2. Background Information

In many large organizations, software systems upon which many users rely lack an architecture and/or a sustainable operating model that is designed to produce curated data and to provide a mechanism by which the software systems are accountable for the quality of the data. This shortfall may cause downstream process issues and give rise to a lack of user confidence in the data, in addition to impacting automation.

The lack of a data quality mechanism may lead to increased time to action for improving data quality and the expenditure of a significant amount of time and resources for building solutions and/or using tools to identify the issues that are causing data quality to be inadequate. In addition, this shortfall may cause a lack of accountability, which may hamper efforts to determine what remedies are required, and it may also result in a lack of advanced actionable analytics with respect to a data quality lifecycle. There may also be shortfalls with respect to scalability of solutions and tools, as volume, velocity, and variety of data increases.

Accordingly, there is a need for a method for integrating and automating data quality components of defining, analyzing, measuring, and remediating, and empowering application owners to obtain actionable insights to data quality issues.

SUMMARY

The present disclosure, through one or more of its various aspects, embodiments, and/or specific features or sub-components, provides, inter alia, various systems, servers, devices, methods, media, programs, and platforms for integrating and automating data quality components of defining, analyzing, measuring, and remediating, and empowering application owners to obtain actionable insights to data quality issues.

According to an aspect of the present disclosure, a method for assessing data quality is provided. The method is implemented by at least one processor. The method includes: receiving, by the at least one processor, receiving, by the at least one processor, a first data set that relates to a first application; analyzing, by the at least one processor, a data quality of the first data set by applying at least one predetermined rule to the first data set; generating, by the at least one processor based on a result of the analyzing, a report that includes information that relates to the data quality of the first data set; and transmitting, by the at least one processor, the report to a predetermined destination.

The analyzing may include executing a first artificial intelligence (AI) algorithm that uses a machine learning technique to apply the at least one predetermined rule to the first data set.

The executing of the first AI algorithm may generate an output that includes an identification of at least one anomaly with respect to historical data that relates to the first data set.

The analyzing may include measuring at least one metric that relates to the data quality of the first data set.

The method may further include using a result of the analyzing to generate a data quality score that indicates a confidence level with respect to the data quality of the first data set.

The method may further include using a result of the analyzing to generate at least one recommendation for improving the data quality of the first data set.

The report may include an identification of at least one issue that relates to the data quality of the first data set and a proposed remediation of the at least one issue.

The analyzing may include determining whether a contractual requirement that relates to the data quality of the first data set has been satisfied.

The method may further include displaying at least a portion of the information included in the report on a display via a graphical user interface (GUI).

According to another exemplary embodiment, a computing apparatus for assessing data quality is provided. The computing apparatus includes a processor; a memory; a display; and a communication interface coupled to each of the processor, the memory, and the display. The processor is configured to: receive, via the communication interface, a first data set that relates to a first application; analyze a data quality of the first data set by applying at least one predetermined rule to the first data set; generate, based on a result of the analysis, a report that includes information that relates to the data quality of the first data set; and transmit, via the communication interface, the report to a predetermined destination.

The processor may be further configured to perform the analysis by executing a first artificial intelligence (AI) algorithm that uses a machine learning technique to apply the at least one predetermined rule to the first data set.

The execution of the first AI algorithm may generate an output that includes an identification of at least one anomaly with respect to historical data that relates to the first data set.

The processor may be further configured to measure at least one metric that relates to the data quality of the first data set.

The processor may be further configured to use a result of the analysis to generate a data quality score that indicates a confidence level with respect to the data quality of the first data set.

The processor may be further configured to use a result of the analysis to generate at least one recommendation for improving the data quality of the first data set.

The report may include an identification of at least one issue that relates to the data quality of the first data set and a proposed remediation of the at least one issue.

The processor may be further configured to determine whether a contractual requirement that relates to the data quality of the first data set has been satisfied.

The processor may be further configured to cause the display to display at least a portion of the information included in the report on a display via a graphical user interface (GUI).

According to yet another exemplary embodiment, a non-transitory computer readable storage medium storing instructions for assessing data quality is provided. The storage medium includes executable code which, when executed by a processor, causes the processor to: receive a first data set that relates to a first application; analyze a data quality of the first data set by applying at least one predetermined rule to the first data set; generate, based on a result of the analysis, a report that includes information that relates to the data quality of the first data set; and transmit, via the communication interface, the report to a predetermined destination.

When executed by the processor, the code may further cause the processor to execute a first artificial intelligence (AI) algorithm that uses a machine learning technique to apply the at least one predetermined rule to the first data set.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Figure 1:
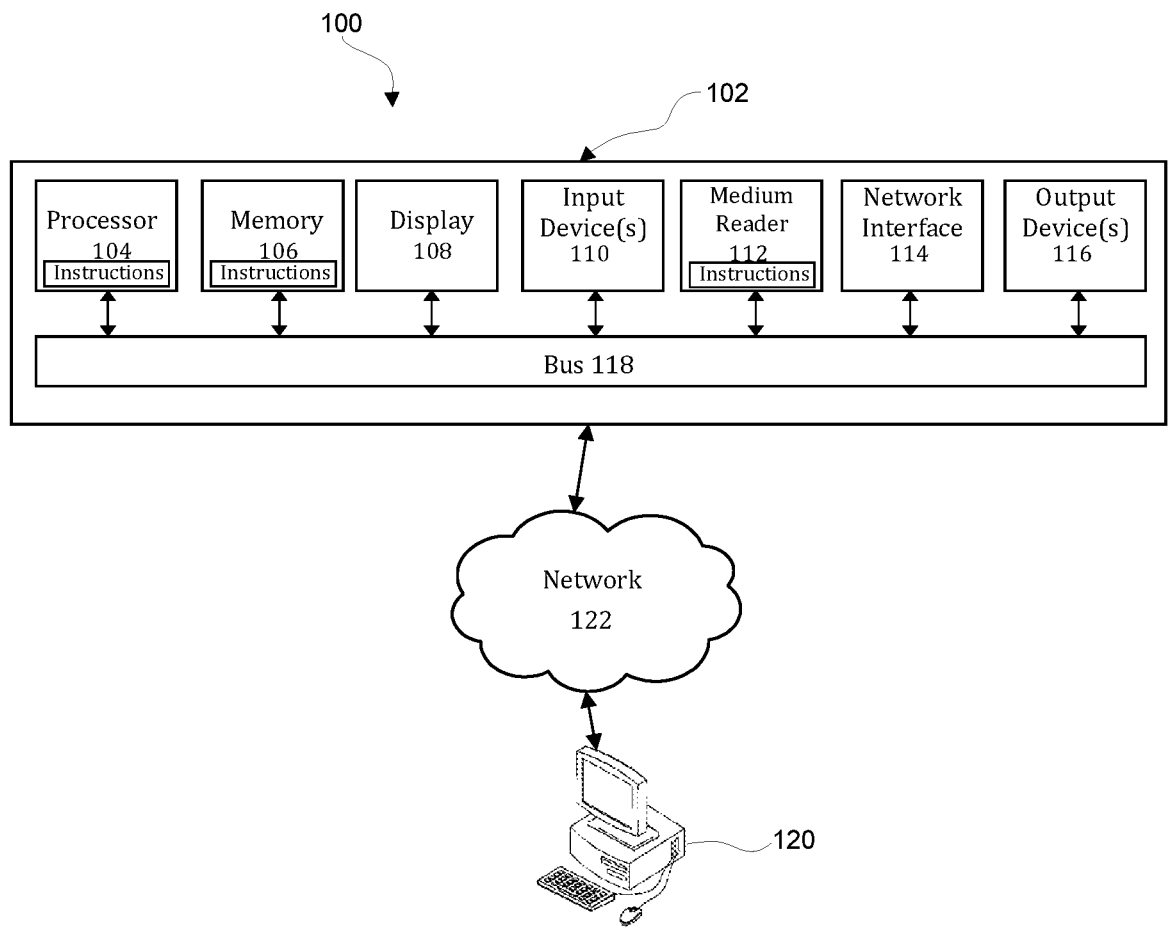
FIG. 1 illustrates an exemplary computer system.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data as well as executable instructions and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid state display, a cathode ray tube (CRT), a plasma display, or any other type of display, examples of which are well known to skilled persons.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g. software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote-control output, a printer, or any combination thereof.

Each of the components of the computer system 102 may be interconnected and communicate via a bus 118 or other communication link. As illustrated in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is illustrated in FIG. 1 as a wireless network, those skilled in the art appreciate that the network 122 may also be a wired network.

The additional computer device 120 is illustrated in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

As described herein, various embodiments provide optimized methods and systems for integrating and automating data quality components of defining, analyzing, measuring, and remediating, and empowering application owners to obtain actionable insights to data quality issues.

Figure 2:
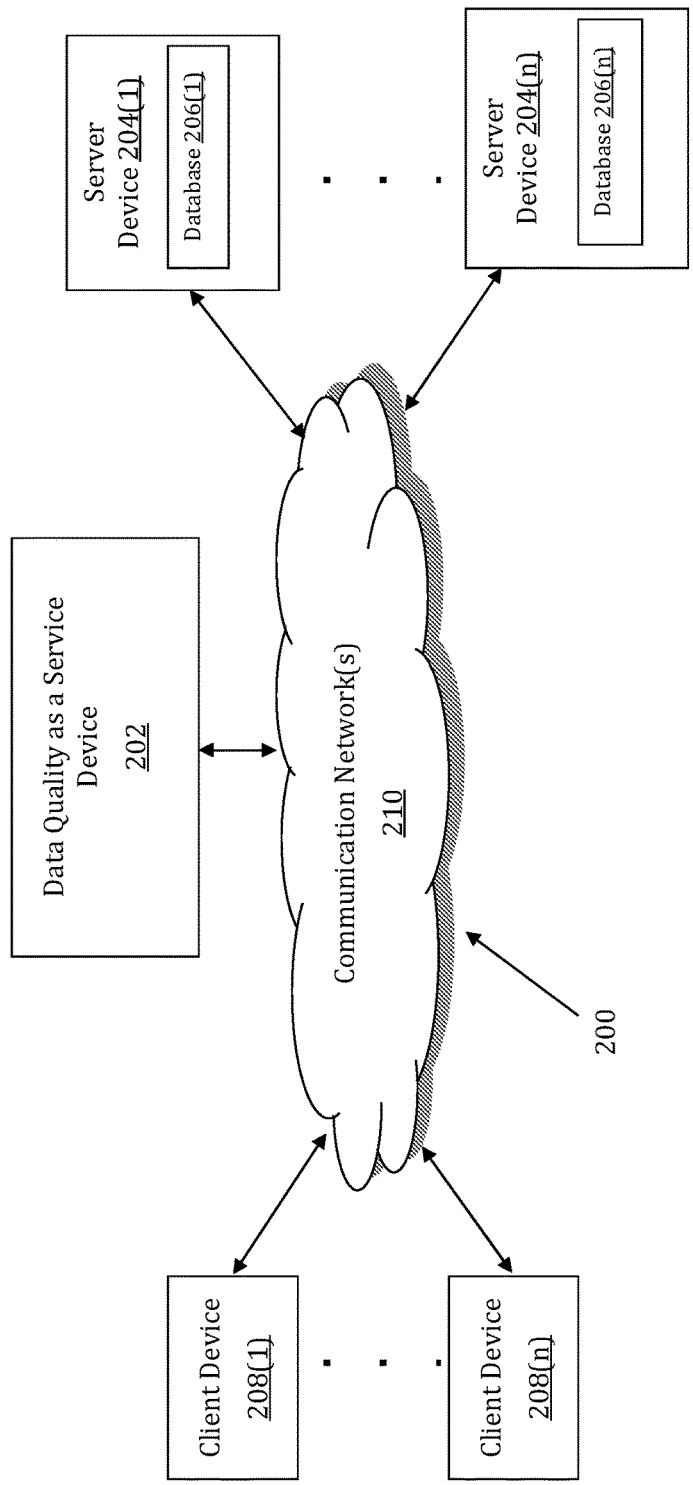
FIG. 2 illustrates an exemplary diagram of a network environment.

Referring to FIG. 2, a schematic of an exemplary network environment 200 for implementing a method for integrating and automating data quality components of defining, analyzing, measuring, and remediating, and empowering application owners to obtain actionable insights to data quality issues is illustrated. In an exemplary embodiment, the method is executable on any networked computer platform, such as, for example, a personal computer (PC).

The method for integrating and automating data quality components of defining, analyzing, measuring, and remediating, and empowering application owners to obtain actionable insights to data quality issues may be implemented by a Data Quality as a Service (DQaaS) device 202. The DQaaS device 202 may be the same or similar to the computer system 102 as described with respect to FIG. 1. The DQaaS device 202 may store one or more applications that can include executable instructions that, when executed by the DQaaS device 202, cause the DQaaS device 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the DQaaS device 202 itself, may be located in virtual server(s) running in a cloud-based computing environment rather than being tied to one or more specific physical network computing devices. Also, the application(s) may be running in one or more virtual machines (VMs) executing on the DQaaS device 202. Additionally, in one or more embodiments of this technology, virtual machine(s) running on the DQaaS device 202 may be managed or supervised by a hypervisor.

In the network environment 200 of FIG. 2, the DQaaS device 202 is coupled to a plurality of server devices 204(1)-204(n) that hosts a plurality of databases 206(1)-206(n), and also to a plurality of client devices 208(1)-208(n) via communication network(s) 210. A communication interface of the DQaaS device 202, such as the network interface 114 of the computer system 102 of FIG. 1, operatively couples and communicates between the DQaaS device 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the DQaaS device 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein. This technology provides a number of advantages including methods, non-transitory computer readable media, and DQaaS devices that efficiently implement a method for integrating and automating data quality components of defining, analyzing, measuring, and remediating, and empowering application owners to obtain actionable insights to data quality issues.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The DQaaS device 202 may be a standalone device or integrated with one or more other devices or apparatuses, such as one or more of the server devices 204(1)-204(n), for example. In one particular example, the DQaaS device 202 may include or be hosted by one of the server devices 204(1)-204(n), and other arrangements are also possible. Moreover, one or more of the devices of the DQaaS device 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the DQaaS device 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store application-specific information that relates to data quality issues and data quality metrics data that relates to metrics used for measuring various aspects of data quality.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. For example, the client devices 208(1)-208(n) in this example may include any type of computing device that can interact with the DQaaS device 202 via communication network(s) 210. Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, for example. In an exemplary embodiment, at least one client device 208 is a wireless mobile communication device, i.e., a smart phone.

The client devices 208(1)-208(n) may run interface applications, such as standard web browsers or standalone client applications, which may provide an interface to communicate with the DQaaS device 202 via the communication network(s) 210 in order to communicate user requests and information. The client devices 208(1)-208(n) may further include, among other features, a display device, such as a display screen or touchscreen, and/or an input device, such as a keyboard, for example.

Although the exemplary network environment 200 with the DQaaS device 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the DQaaS device 202, the server devices 204(1)-204(n), or the client devices 208(1)-208(n), for example, may be configured to operate as virtual instances on the same physical machine. In other words, one or more of the DQaaS device 202, the server devices 204(1)-204(n), or the client devices 208(1)-208(n) may operate on the same physical device rather than as separate devices communicating through communication network(s) 210. Additionally, there may be more or fewer DQaaS devices 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
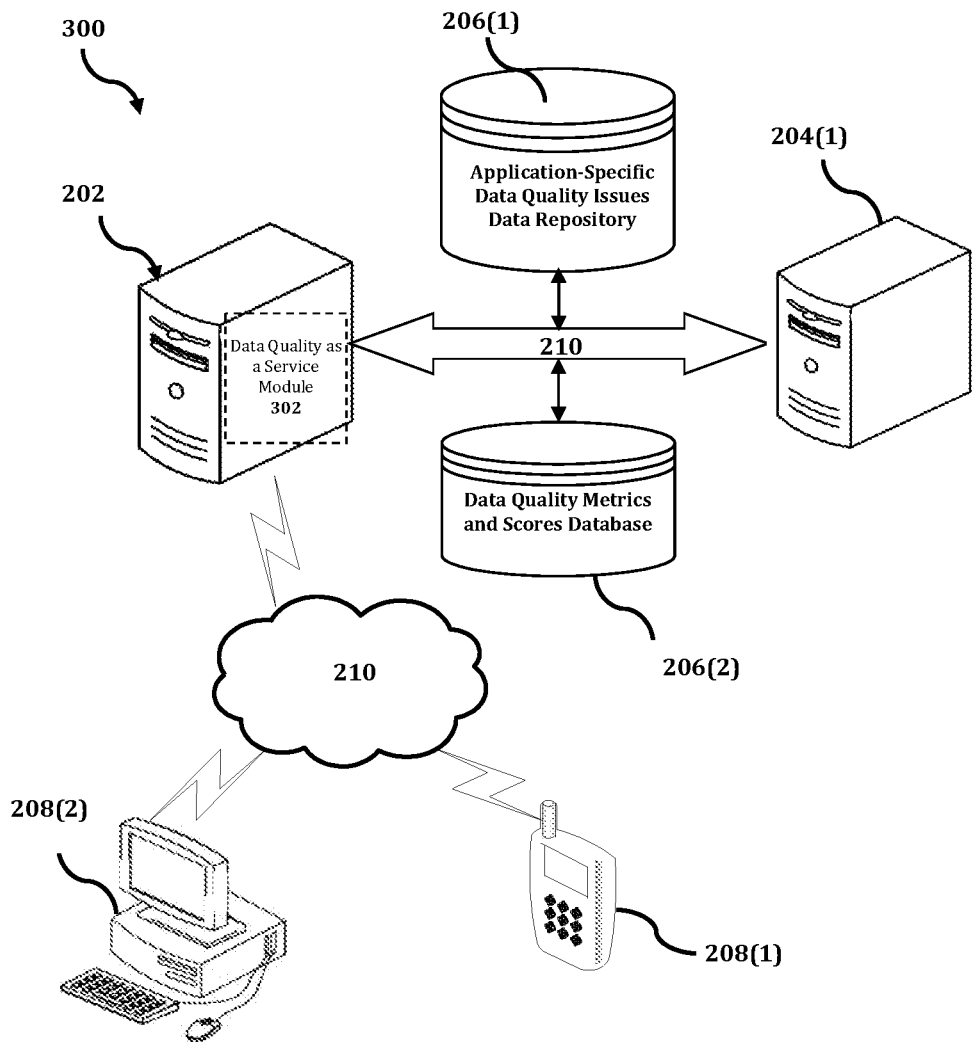
FIG. 3 shows an exemplary system for implementing a method for integrating and automating data quality components of defining, analyzing, measuring, and remediating, and empowering application owners to obtain actionable insights to data quality issues.

The DQaaS device 202 is described and illustrated in FIG. 3 as including a data quality as a service module 302, although it may include other rules, policies, modules, databases, or applications, for example. As will be described below, the data quality as a service module 302 is configured to implement a method for integrating and automating data quality components of defining, analyzing, measuring, and remediating, and empowering application owners to obtain actionable insights to data quality issues.

An exemplary process 300 for implementing a mechanism for integrating and automating data quality components of defining, analyzing, measuring, and remediating, and empowering application owners to obtain actionable insights to data quality issues by utilizing the network environment of FIG. 2 is illustrated as being executed in FIG. 3. Specifically, a first client device 208(1) and a second client device 208(2) are illustrated as being in communication with DQaaS device 202. In this regard, the first client device 208(1) and the second client device 208(2) may be "clients" of the DQaaS device 202 and are described herein as such. Nevertheless, it is to be known and understood that the first client device 208(1) and/or the second client device 208(2) need not necessarily be "clients" of the DQaaS device 202, or any entity described in association therewith herein. Any additional or alternative relationship may exist between either or both of the first client device 208(1) and the second client device 208(2) and the DQaaS device 202, or no relationship may exist.

Further, DQaaS device 202 is illustrated as being able to access an application-specific data quality issues data repository 206(1) and a data quality metrics and scores database 206(2). The data quality as a service module 302 may be configured to access these databases for implementing a method for integrating and automating data quality components of defining, analyzing, measuring, and remediating, and empowering application owners to obtain actionable insights to data quality issues.

The first client device 208(1) may be, for example, a smart phone. Of course, the first client device 208(1) may be any additional device described herein. The second client device 208(2) may be, for example, a personal computer (PC). Of course, the second client device 208(2) may also be any additional device described herein.

The process may be executed via the communication network(s) 210, which may comprise plural networks as described above. For example, in an exemplary embodiment, either or both of the first client device 208(1) and the second client device 208(2) may communicate with the DQaaS device 202 via broadband or cellular communication. Of course, these embodiments are merely exemplary and are not limiting or exhaustive.

Upon being started, the data quality as a service module 302 executes a process for integrating and automating data quality components of defining, analyzing, measuring, and remediating, and empowering application owners to obtain actionable insights to data quality issues. An exemplary process for integrating and automating data quality components of defining, analyzing, measuring, and remediating, and empowering application owners to obtain actionable insights to data quality issues is generally indicated at flowchart 400 in FIG. 4.

Figure 4:
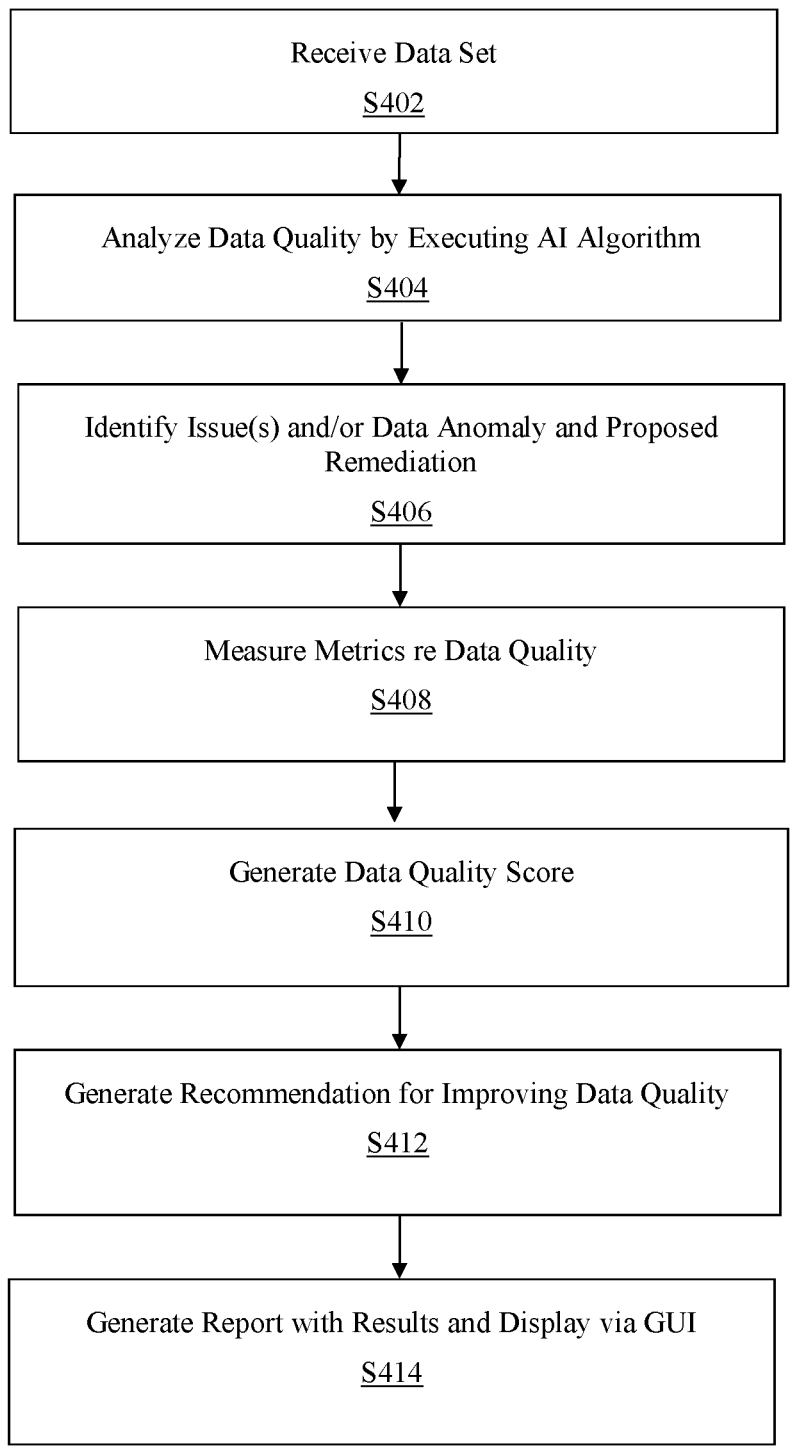
FIG. 4 is a flowchart of an exemplary process for implementing a method for integrating and automating data quality components of defining, analyzing, measuring, and remediating, and empowering application owners to obtain actionable insights to data quality issues.

In process 400 of FIG. 4, at step S402, the data quality as a service module 302 receives a set of data that relates to an application. Then, at step S404, the data quality as a service module 302 analyzes the quality of the received set of data by applying one or more predetermined rules thereto. In an exemplary embodiment, the predetermined rules pertain to various aspects of data quality, such as accuracy, completeness, timeliness, and/or any other suitable data quality characteristic. In an exemplary embodiment, the analysis of the data quality is performed by executing an artificial intelligence (AI) algorithm that implements a machine learning technique to apply the predetermined rules to the data set.

At step S406, the data quality as a service module 302 identifies one or more issues and/or a data anomaly that relates to the quality of the data set, based on a result of the analysis performed in step S404. In an exemplary embodiment, the data quality as a service module 302 may also provide a proposed remediation for overcoming the identified issue(s). For example, when a contractual requirement such as a Service Level Agreement (SLA) is applicable to the data set, the data quality as a service module 302 may use the results of the analysis to determine whether the contractual requirement has been satisfied.

In an exemplary embodiment, the data anomaly may be identified as an output of the AI algorithm based on a comparison between the data set received in step S402 and historical data that has previously been generated by the same application. In this scenario, the historical data may generally fall within a particular range or category, and thus, if the data set received in step S402 falls outside of the particular range or category, the data quality as a service module 302 may determine that an anomaly exists with respect to the received data set.

At step S408, the data quality as a service module 302 measures one or more metrics that relate to the quality of the data set, based on a result of the analysis performed in step S404. Then, at step S410, the data quality as a service module 302 generates a data quality score that indicates a confidence level with respect to the overall data quality of the data set.

At step S412, the data quality as a service module 302 generates recommendations for improving the data quality, based on a result of the analysis performed in step S404. Then, at step S414, the data quality as a service module 302 generates a report that includes information that relates to the data quality of the received data set, and transmits the report to at least one predetermined destination, such as, for example, personnel that are tasked with maintaining the quality of the data with respect to the particular application. In an exemplary embodiment, at least a portion of the report is displayable on a display via a graphical user interface (GUI). The displayed portion of the report may include the recommendations for improving the data quality, thereby providing specific, actionable suggestions in order to ensure a high level of data quality.

In an exemplary embodiment, the data quality as a service module 302 provides several advantageous aspects, including the following: 1) an ability to understand business requirements via data contracts; 2) an ability to define business rules and technical rules; 3) a mechanism for automated communication with responsible parties in order to facilitate remedies and fixes with respect to the data; 4) a mechanism for historical data collection for analysis, tracking, and audit purposes; 5) integration with organizational procedures for risk management and reporting; 6) a mechanism that facilitates visualization of data quality issues, in order to enable application owners and users to identify problem areas; 7) a data quality score and/or index and/or ratings for easy understanding of data quality; 8) application programming interface (API) and user interface (UI)-based data quality rules definition; 9) an ability to run data quality checks on demand and/or on an inline or periodic schedule; 10) integration with an API, databases, and streaming; 11) cloud availability; 12) anomaly detection via machine learning; 13) data correlation and recommendation engine; 14) integration with a Master Data Management (MDM) solution for improved data quality across an application and related data sets; and 15) integration with a data catalog.

Figure 5:
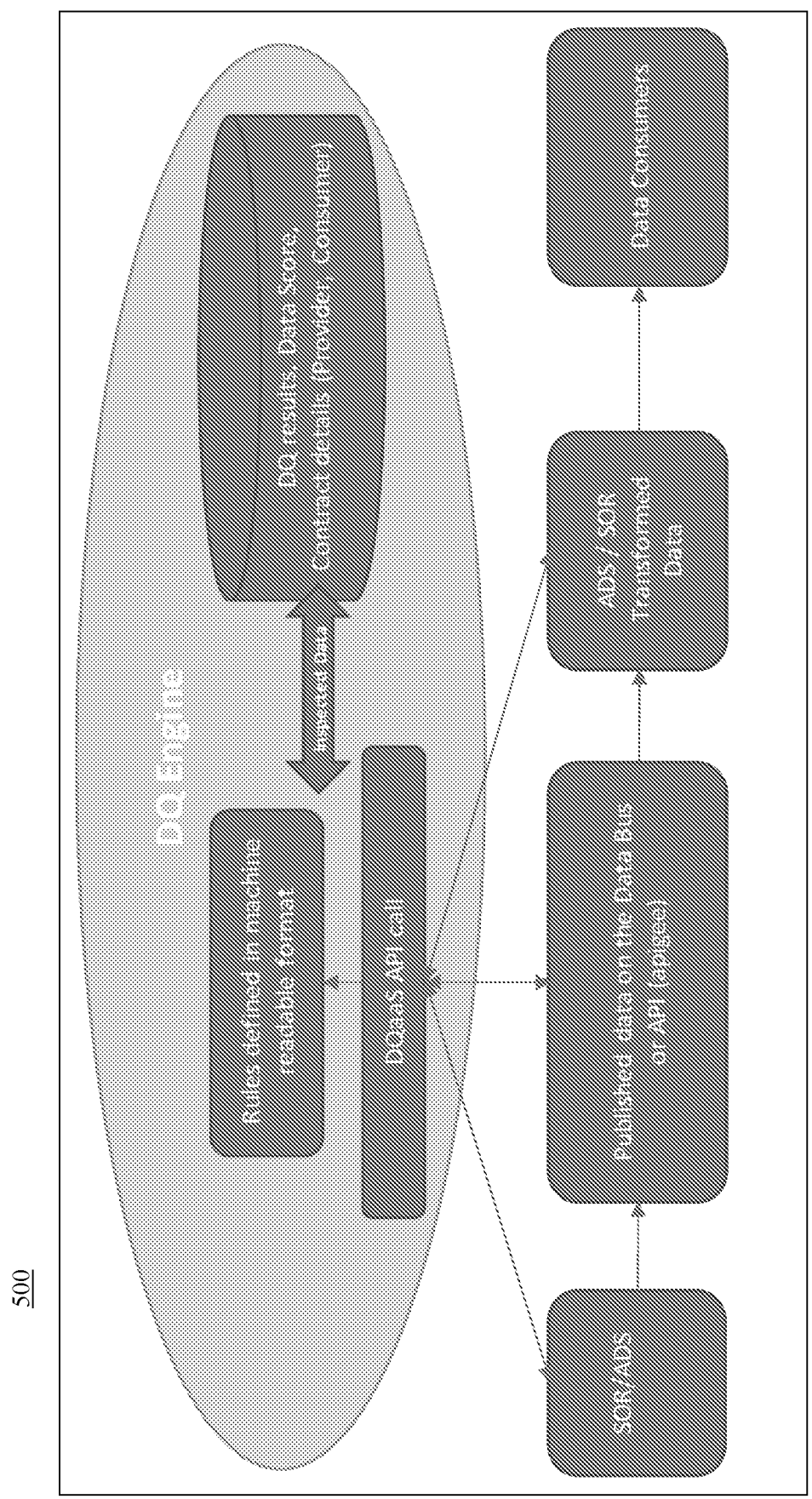
FIG. 5 is a diagram that illustrates a conceptual data flow in a system configured for integrating and automating data quality components of defining, analyzing, measuring, and remediating, and empowering application owners to obtain actionable insights to data quality issues, according to an exemplary embodiment.

FIG. 5 is a diagram 500 that illustrates a conceptual data flow in a system configured for integrating and automating data quality components of defining, analyzing, measuring, and remediating, and empowering application owners to obtain actionable insights to data quality issues, according to an exemplary embodiment.

As shown in FIG. 5, a data quality (DQ) engine includes a data quality as a service (DQaaS) component that receives data via an API call from various sources, such as a System of Record/Authoritative Data Source (SOR/ADS), published data on a data bus or API, and/or ADS/SOR transformed data. The DQ engine also includes a component that applies rules that are defined in a machine readable format to the data received via the API call. The DQ engine also accesses a database that includes data quality results, data quality scores, and contract details that relate to data provider contracts, data consumer contracts, and/or SLAs. As a result of the application of the rules to the data, the DQ engine generates a report that include information that relates to the data quality of the data received via the API call. The report may include results of an analysis of data quality issues, key data quality metrics and performance measures, such as a percentage of data quality improvement and/or a data quality index (i.e., DQ index), and data quality contracts reinforcement. The DQ index may be measured over a period of time, and the report may include information showing how the DQ index has trended over the period of time. The report may be transmitted to interested parties and may be displayable via a DQ dashboard. Automated email notifications may also be transmitted to interested parties, such as data providers.

Figure 6:
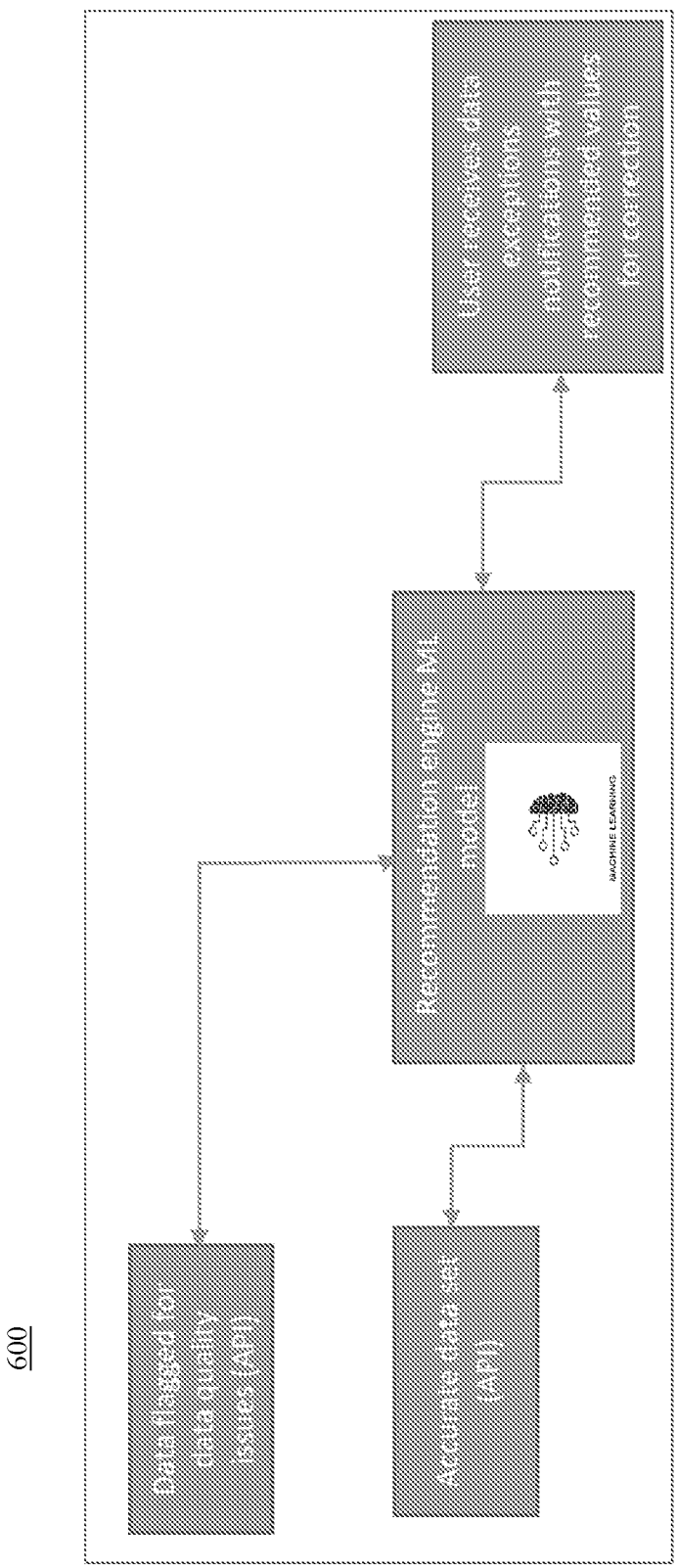
FIG. 6 is a diagram that illustrates a data flow with respect to a machine learning model that generates recommendations for improving data quality in a system configured for integrating and automating data quality components of defining, analyzing, measuring, and remediating, and empowering application owners to obtain actionable insights to data quality issues, according to an exemplary embodiment.

FIG. 6 is a diagram 600 that illustrates a data flow with respect to a machine learning model that generates recommendations for improving data quality in a system configured for integrating and automating data quality components of defining, analyzing, measuring, and remediating, and empowering application owners to obtain actionable insights to data quality issues, according to an exemplary embodiment.

As illustrated in FIG. 6, a recommendation engine machine learning (ML) model component is configured to execute an AI algorithm that uses a data set as an input and generates an output that indicates a result of an analysis of the data quality of the input data set. The recommendation engine may provide outputs via APIs, and possible outputs may include an indication that the data set is accurate when the data set has a high level of data quality, or that the data set has been flagged for data quality issues. The recommendation engine may also provide notifications to users with recommended values for correction, and the notifications may be accompanied by confidence scores to facilitate an ability of a user to accept or reject a recommendation.

In an exemplary embodiment, when the data set has been flagged for data quality issues, the recommendation engine may identify a source of the data quality issues and/or a responsible party, thereby providing a mechanism for highlighting accountability. The recommendation engine may be configured to generate and transmit automated emails to accountable parties in order to address the data quality issues and further highlight accountability.

Figure 7:
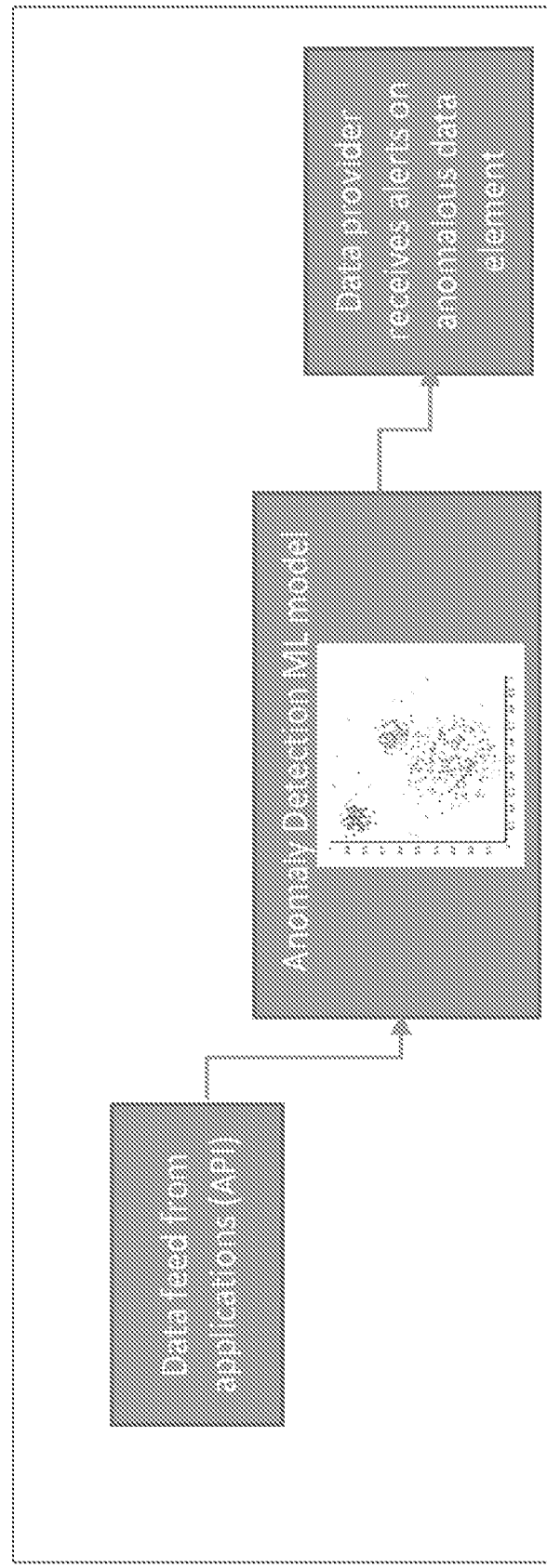
FIG. 7 is a diagram that illustrates a data flow with respect to a machine learning model that detects data anomalies in a system configured for integrating and automating data quality components of defining, analyzing, measuring, and remediating, and empowering application owners to obtain actionable insights to data quality issues, according to an exemplary embodiment.

FIG. 7 is a diagram 700 that illustrates a data flow with respect to a machine learning model that detects data anomalies in a system configured for integrating and automating data quality components of defining, analyzing, measuring, and remediating, and empowering application owners to obtain actionable insights to data quality issues, according to an exemplary embodiment.

As shown in FIG. 7, an anomaly detection machine learning model is configured to execute an AI algorithm that is trained by using historical data and uses a data set received from an application via an API as an input. The AI algorithm identifies events and/or observations that raise suspicions by being statistically different from other observations. In many instances, such anomalous behavior points to incorrect data. As a result, the anomaly detection machine learning model generates an alert that relates to anomalous data elements and sends the alert to interested parties such as data providers.

Figure 8:
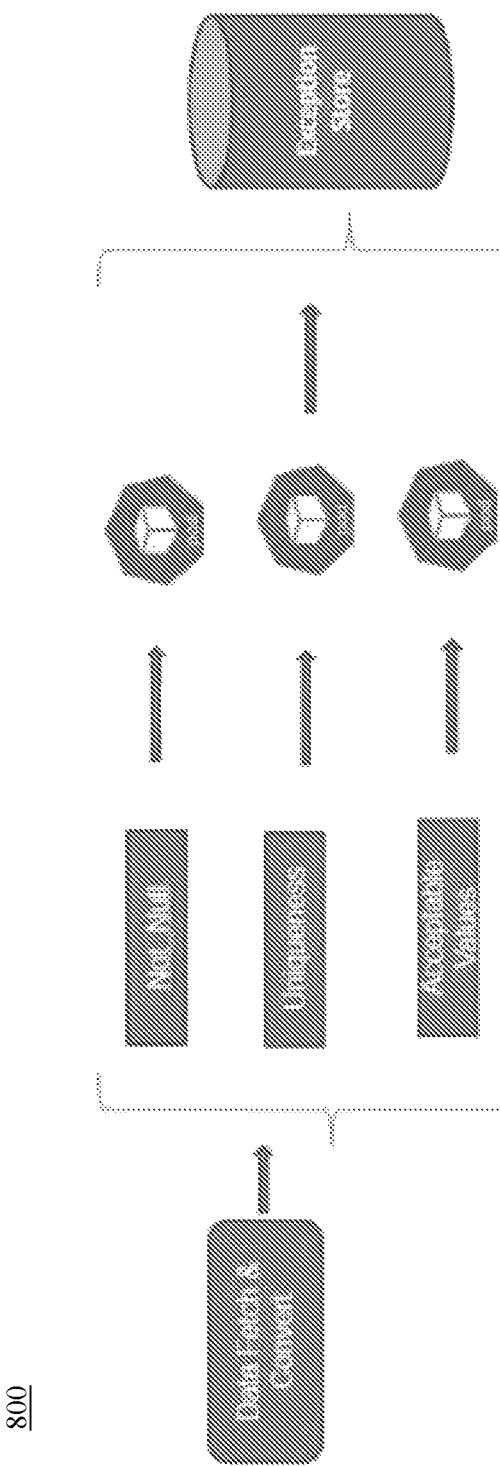
FIG. 8 is a diagram that illustrates a data flow with respect to the use of code as a data quality template in a system configured for integrating and automating data quality components of defining, analyzing, measuring, and remediating, and empowering application owners to obtain actionable insights to data quality issues, according to an exemplary embodiment.

FIG. 8 is a diagram 800 that illustrates a data flow with respect to the use of code as a data quality template in a system configured for integrating and automating data quality components of defining, analyzing, measuring, and remediating, and empowering application owners to obtain actionable insights to data quality issues, according to an exemplary embodiment.

As illustrated in FIG. 8, in an exemplary embodiment, the DQaaS component may include a code as template feature. The code as template feature provides several potential advantages, including the following: 1) Agility with Automation—For known use cases, the implementation time is restricted only by configuring metadata, and as a result, time to market decreases. 2) Scalability—Templates can be run for all sources for a given use case, and as a result, there is no dependency on a particular application or a particular source. 3) Modularization—This provides code manageability and ease in debugging. 4) Governance—This provides control over custom code creation and an ability to enhance the template code to add features, thereby improving the product value. 5) Reusability—Code is reusable, and also adds to an organizational code base for data quality checks.

As illustrated in diagram 800, the code as template feature first performs a data fetch-and-convert operation, and then feeds the converted data into a system for automating deployment, scaling, and management of a containerized application, such as, for example, Kubernetes. The system includes a first path that performs a "not null" operation on the data and feeds a result thereof to a first pod; a second path that performs a "uniqueness" operation on the data and feeds a result thereof to a second pod; and a third path that performs an "acceptable values" operation on the data and feeds a result thereof to a third pod. Finally, all three pods provide their respective contents to an exception store database.

In an exemplary embodiment, the code as template feature creates the template as a particular class in order to separate data quality logic in separate modules. Automatic scaling of execution is based on application load. The template is integrated with software development life cycle tools for code maintenance and deployments.

Accordingly, with this technology, an optimized process for integrating and automating data quality components of defining, analyzing, measuring, and remediating, and empowering application owners to obtain actionable insights to data quality issues is provided.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims, and their equivalents, and shall not be restricted or limited by the foregoing detailed description.

What is claimed is:

1. A method for assessing data quality, the method being implemented by at least one processor, the method comprising:
receiving, by the at least one processor, a first data set that relates to a first application;
analyzing, by the at least one processor, a data quality of the first data set by applying at least one predetermined rule to the first data set,
wherein the analyzing comprises executing a first artificial intelligence (AI) algorithm that uses a machine learning technique to apply the at least one predetermined rule to the first data set to identify data from the first data set that is statistically different,
wherein the first AI algorithm is trained by using historical data;
applying, via the first AI algorithm, a code as a template component that receives the first data set and analyzes the first data set via a plurality of pathways,
wherein a first pathway of the plurality of pathways comprises determining whether the first data set is null,
wherein a second pathway of the plurality of pathways comprises determining whether the first data set is unique, and
wherein a third pathway of the plurality of pathways comprises determining whether the first data set has acceptable values;
outputting each pathway of the plurality of pathways to a respective module;
generating, by the at least one processor based on a result of the analyzing, a report that includes information that relates to the data quality of the first data set; and
transmitting, by the at least one processor, the report to a predetermined destination.

2. The method of claim 1, wherein the executing of the first AI algorithm generates an output that includes an identification of at least one anomaly with respect to historical data that relates to the first data set.

3. The method of claim 1, wherein the analyzing comprises measuring at least one metric that relates to the data quality of the first data set.

4. The method of claim 1, further comprising using a result of the analyzing to generate a data quality score that indicates a confidence level with respect to the data quality of the first data set.

5. The method of claim 1, further comprising using a result of the analyzing to generate at least one recommendation for improving the data quality of the first data set.

6. The method of claim 1, wherein the report includes an identification of at least one issue that relates to the data quality of the first data set, received via an Application Programming Interface, and a proposed remediation of the at least one issue,
wherein the proposed remediation is generated by the first AI algorithm and includes recommended values for improving the data quality of the first data set.

7. The method of claim 1, wherein the analyzing comprises determining whether a contractual requirement that relates to the data quality of the first data set has been satisfied.

8. The method of claim 1, further comprising displaying at least a portion of the information included in the report on a display via a graphical user interface (GUI).

9. A computing apparatus for assessing data quality, the computing apparatus comprising:
a processor;
a memory;
a display; and
a communication interface coupled to each of the processor, the memory, and the display,
wherein the processor is configured to:
receive, via the communication interface, a first data set that relates to a first application;

analyze a data quality of the first data set by applying at least one predetermined rule to the first data set, wherein the analyzing comprises executing a first artificial intelligence (AI) algorithm that uses a machine learning technique to apply the at least one predetermined rule to the first data set to identify data from the first data set that is statistically different, wherein the first AI algorithm is trained by using historical data;

apply, via the first AI algorithm, a code as a template component that receives the first data set and analyzes the first data set via a plurality of pathways, wherein a first pathway of the plurality of pathways comprises determining whether the first data set is null, wherein a second pathway of the plurality of pathways comprises determining whether the first data set is unique, and wherein a third pathway of the plurality of pathways comprises determining whether the first data set has acceptable values;

output each pathway of the plurality of pathways to a respective module;

generate, based on a result of the analysis, a report that includes information that relates to the data quality of the first data set; and transmit, via the communication interface, the report to a predetermined destination.

10. The computing apparatus of claim 9, wherein the execution of the first AI algorithm generates an output that includes an identification of at least one anomaly with respect to historical data that relates to the first data set.

11. The computing apparatus of claim 9, wherein the processor is further configured to measure at least one metric that relates to the data quality of the first data set.

12. The computing apparatus of claim 9, wherein the processor is further configured to use a result of the analysis to generate a data quality score that indicates a confidence level with respect to the data quality of the first data set.

13. The computing apparatus of claim 9, wherein the processor is further configured to use a result of the analysis to generate at least one recommendation for improving the data quality of the first data set.

14. The computing apparatus of claim 9, wherein the report includes an identification of at least one issue that relates to the data quality of the first data set received via an Application Programming Interface, and a proposed remediation of the at least one issue, wherein the proposed remediation is generated by the first AI algorithm and includes recommended values for improving the data quality of the first data set.

15. The computing apparatus of claim 9, wherein the processor is further configured to determine whether a contractual requirement that relates to the data quality of the first data set has been satisfied.

16. The computing apparatus of claim 9, wherein the processor is further configured to cause the display to display at least a portion of the information included in the report on a display via a graphical user interface (GUI).

17. A non-transitory computer readable storage medium storing instructions for assessing data quality, the storage medium comprising executable code which, when executed by a processor, causes the processor to:

receive a first data set that relates to a first application;

analyze a data quality of the first data set by applying at least one predetermined rule to the first data set, wherein the analyzing comprises executing a first artificial intelligence (AI) algorithm that uses a machine learning technique to apply the at least one predetermined rule to the first data set to identify data from the first data set that is statistically different, wherein the first AI algorithm is trained by using historical data;

apply, via the first AI algorithm, a code as a template component that receives the first data set and analyzes the first data set via a plurality of pathways, wherein a first pathway of the plurality of pathways comprises determining whether the first data set is null, wherein a second pathway of the plurality of pathways comprises determining whether the first data set is unique, and wherein a third pathway of the plurality of pathways comprises determining whether the first data set has acceptable values;

output each pathway of the plurality of pathways to a respective module;

generate, based on a result of the analysis, a report that includes information that relates to the data quality of the first data set; and transmit, via a communication interface, the report to a predetermined destination.

* * * * *